United States Patent

[11] 3,578,185

[72] Inventor David F. Black
 Salt Lake City, Utah
[21] Appl. No. 856,409
[22] Filed Sept. 9, 1969
[45] Patented May 11, 1971
[73] Assignee The United States of America as represented by the Secretary of the Army

[54] MECHANIZED VEHICLE SYSTEM
 7 Claims, 7 Drawing Figs.
[52] U.S. Cl. ................................................. 214/38,
 49/263, 214/83.26, 214/84
[51] Int. Cl. ................................................. B60p 1/52
[50] Field of Search .......................................... 214/38.22,
 38.8, 83.26, 84; 49/263

[56] References Cited
UNITED STATES PATENTS
2,904,196 9/1959 Teixeira ....................... 214/84

3,220,572 11/1965 Curtis ........................ 214/38(.22)X

*Primary Examiner*—Robert G. Sheridan
*Attorneys*—Harry M. Saragovitz, Edward J. Kelly and Herbert Berl ABSTRACT: A mechanized system for the automatic loading and unloading of a vehicle of the front loading type. The vehicle is provided with a cab which will swing 90° to the left thereof and a bed which is movable longitudinally on the vehicle's chassis. Powered rollers on the floor of the bed move the cargo into or out of the vehicle. A switch in front of the vehicle's cab will activate means to open the door of a warehouse when the cab is in close proximity to the warehouse dock. The cab is swung to the left of the vehicle and the bed moved onto the dock to the warehouse door. All operations are controlled by the driver and he is protected from inclement weather at all times. The system eliminates the need for fork lifts in loading or unloading.

Patented May 11, 1971
3,578,185
2 Sheets-Sheet 1
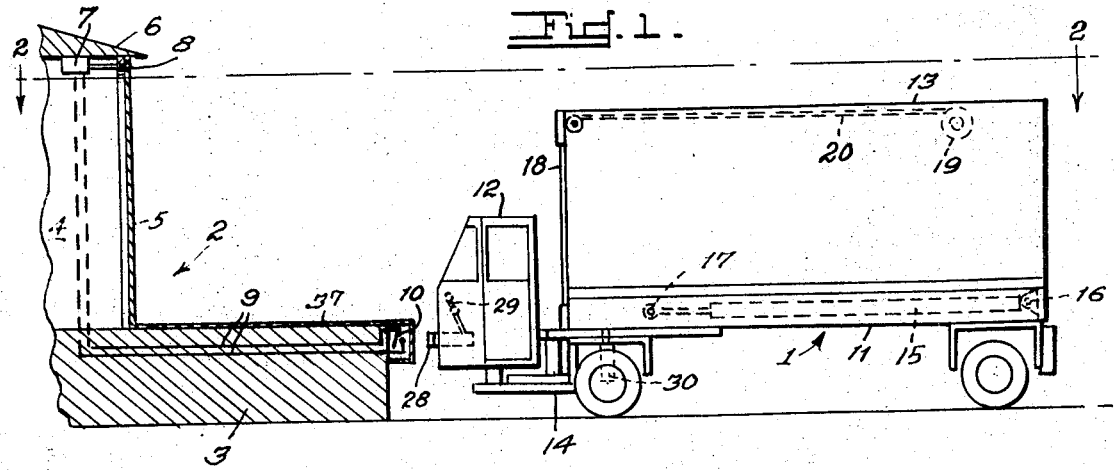
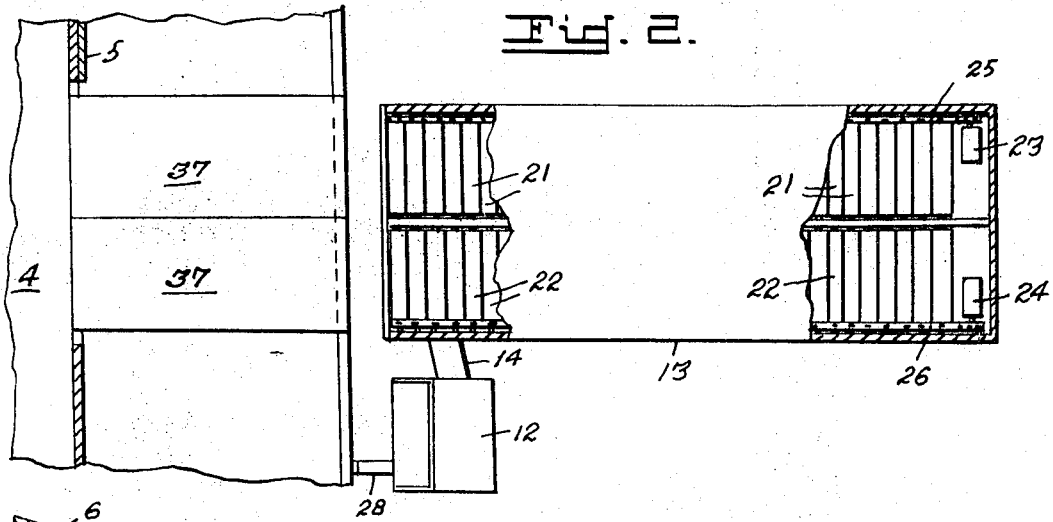
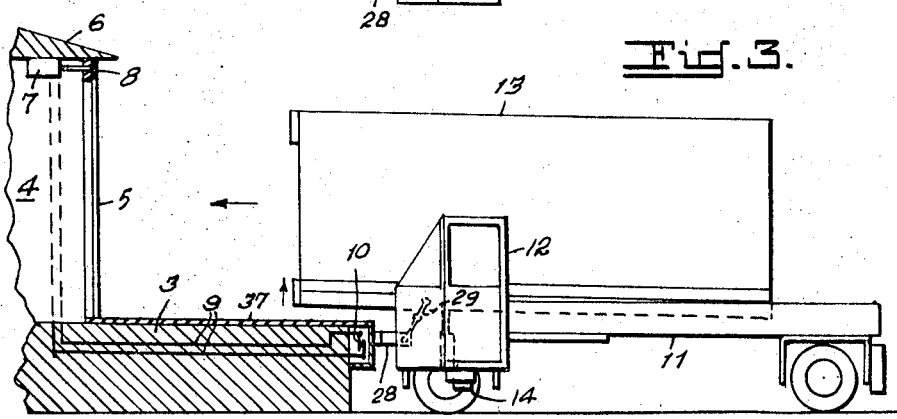
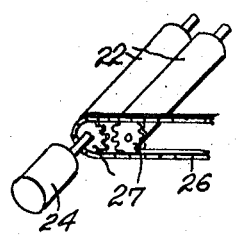
INVENTOR,
David F. Black
BY: Harry M. Saragovitz,
Edward J. Kelly &
Herbert Berl       ATTORNEYS.

Patented May 11, 1971

INVENTOR,
David F. Black

BY: Harry M. Saragovitz,
Edward J. Kelly &
Herbert Berl
ATTORNEYS.

MECHANIZED VEHICLE SYSTEM

The invention described herein may be manufacture, used and licensed by or for the Government for governmental purposes without the payment to me of any royalty thereon.

The present system is for the loading and unloading of a vehicle and more particularly for accomplishing the operations automatically.

The usual system for loading or unloading vehicles consists in placing components of the cargo on pallets which are then handled by a fork lift.

Warehouses usually have a door to close the storage area and a loading dock in front of the storage area. This dock may be raised to the level of a vehicle bed or may be at ground level. Considerably labor and time is expended in loading and unloading operations. Since many freight vehicles are side loading, the driver must locate the side door at the warehouse dock, or if the bed is of the rear loading type, the vehicle must be backed up to the dock. The load is handled manually by dollies or by fork lift trucks, thus requiring extra personnel. If the weather was inclement, the load had to be covered by a tarpaulin while being handled.

The present system is designed to overcome the aforesaid difficulties by moving the bed of the vehicle up to the warehouse door and by rollers that are rotated by power, move the load into or out of the bed with respect to the storage area of the warehouse. All operations will be automatic and controls for activating each operation will be located at some convenient point in the driver's cab where he can control the operations without leaving his seat. A roller conveyor will be used where the dock is at ground level.

It is therefore a principal object of this invention to provide a system for loading or unloading a vehicle at a warehouse dock automatically and controlled by the driver.

Another object is to perform the loading and unloading operations without the use of fork lifts.

A further object is to perform the aforesaid operations by a single operator.

Other advantages of the invention will become apparent from the following description read in conjunction with the attached drawings in which:

FIG. 1 is a somewhat schematic elevation, partly in section, of a vehicle approaching the loading dock of a warehouse;

FIG. 2 is a sectional view, taken along lines 2-2 of FIG. 1, showing the driver's cab swung 90° to the left and the vehicle moved close to the dock for operation of the means for opening the warehouse door;

FIG. 3 is a view similar to FIG. 1 and showing the bed of the vehicle raised in front and extended a short distance over the dock;

FIG. 7 is a detail, in perspective, of one type of drive for the powered bed rollers.

Figure 4:
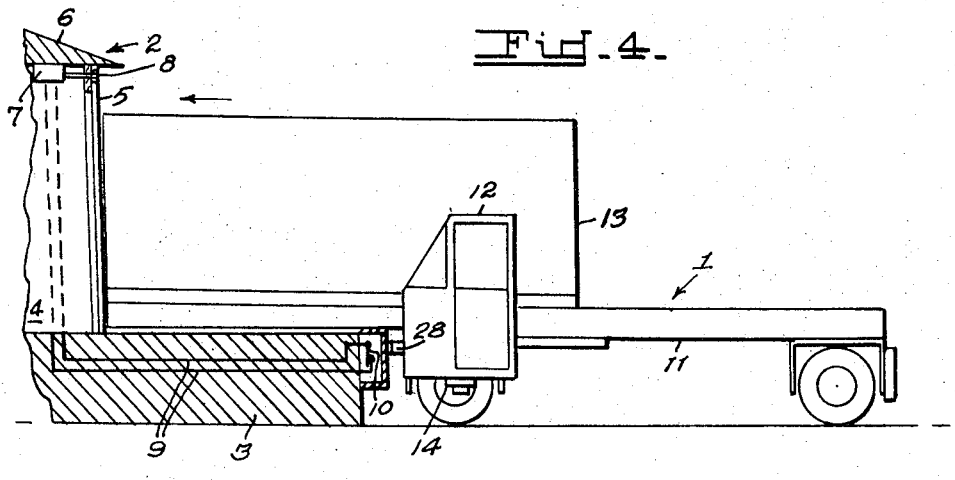
FIG. 4 is a similar view showing the bed of the vehicle lowered onto the dock and extended up to the warehouse door.

Referring now to the drawings in which FIGS. 1—4 are schematic views of the system of loading or unloading a vehicle at a warehouse where the dock is a raised platform.

The system includes both a transport vehicle indicated generally by 1 and a warehouse and dock indicated generally by 2. The warehouse and dock includes a raised platform 3 and a covered storage area 4 having a roof 6 and is closed by a door 5. Means for operating the door 5 consists of a motor 7 which is connected by a gear and rack 8 which will open the door 5 when the motor 7 is activated. The door 5 may close by an inclined track or weights or by any other usual means not shown. Motor 7 is connected by electrical leads 9 to a switch 10 located at the upper front side of platform 3. Switch 3 is shown best in FIG. 1 and may be of any type suitable for the purpose.

Vehicle 1 is capable of highway service as well as for service between loading areas and is of the front loading type. Vehicle 1 consists of a chassis 11, a driver's cab 12 and a covered bed 13.

Cab 12 is adapted to swing to the left 90° with respect to the vehicle's longitudinal axis. Means for swinging cab 12 may consist of hydraulic mechanism indicated by 14 and may be of the type, for example, as in U.S. Pat. No. 3,233,765.

Bed 13 is adapted to be moved forwardly or rearwardly on chassis 11 and one means for moving the bed 13 may consist of a pair of hydraulic rams 15 located, one on each side of bed 13 and may be pivoted at their rearward end to chassis 11 at 16 and at their forward end to bed 13 as at 17, one only being shown schematically in FIG. 1.

Figure 6:
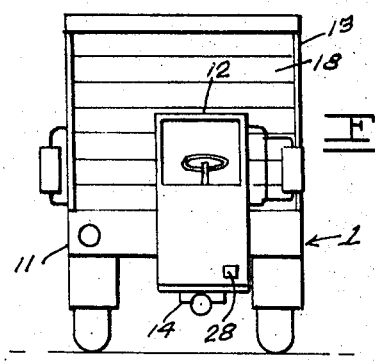
FIG. 6 is a front elevation of the vehicle used in the system.

A door 18 may be provided for closing the front of bed 13, and as seen in FIG. 6, may be of slats that are hinged and adapted to roll up in the ceiling of bed 13. Means for rolling up door 18 are shown schematically in FIG. 1 and consists of a motor and drum 19 and a cable 20 which is connected to door and is reeled up by the motor and drum 19. Other means could be used as expedient.

Means are provided to move a cargo into or out of bed 13, and as seen in FIGS. 2 and 7 may consist of two rows of parallel rollers 21 and 22 transversely mounted in the floor of bed 13. A pair of motors 23 and 24 mounted in the rear of bed 13 rotates chains 25 and 26 which ride over sprockets 27 carried by the rollers 21 and 22 as seen FIG. 7. Motors 23 and 24 are of the reversible type so that the rollers 21 and 22 may be rotated clockwise or counterclockwise. Each roller will have a sprocket in engagement with a respective chain.

Means for operating switch 10 from cab 12 are provided and consists of a magnet 28 located in front of cab 12. This magnet 28 may be extended by mechanical means such as a lever 29 located in cab 12. When extended to the switch 10, it will attract the switch 10 to close. When retracted, the switch will open.

Means are provided to raise the forward portion of bed 13 to clear the platform 3 schematically shown in FIG. 1 and may consist of a pair of hydraulic cylinders 30, one only being shown. These cylinders could also act as shock absorbers for bed 13 in transit.

All controls, not shown, for operating the aforesaid mechanisms will be located at a point in cab 12 that will be convenient for the driver so that he may remain at his seat during the loading operations; such an arrangement is seen in FIG. 8 of U.S. Pat. No. 3,233,765.

Figure 5:
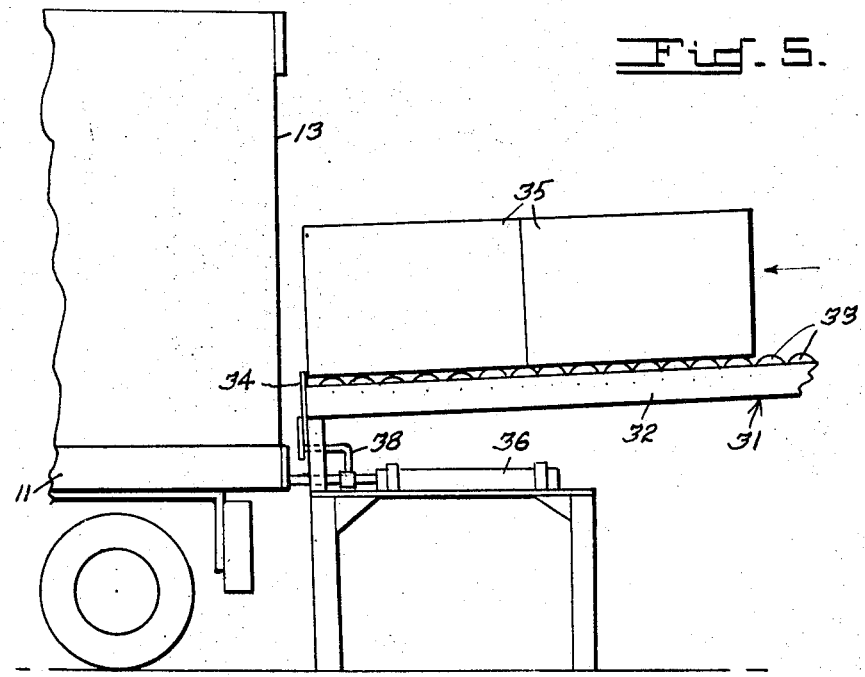
FIG. 5 is a partial side elevation of a conveyor type dock used where the loading area of the warehouse is at ground level.

In cases where the loading dock is at ground level, a conveyor must be used. One type of conveyor is illustrated in FIG. 5 and is indicated generally by 31 and consists of a rack 32 having transversely arranged rollers 33. As shown, the rack 32 is inclined towards bed 13 of vehicle 1 for loading. When unloading, the rack 32 may be turned around, or it may be pivoted so that it can incline away from bed 13. If the storage area is higher than the vehicle bed 13, rollers 33 may be power operated by any suitable manner. A stop 34 is provided at the lowermost end of rack 32 so that a cargo 35 may be placed on rollers 33 and will be retained until they are to be loaded in bed 13. A plunger 36 mounted on rack 32 will, when pushed in by bed 13 moving forward, cause stop 34 to drop and permit the cargo 35 to roll onto rollers 21 and 22 in bed 13. Plunger 36 may operate stop 34 in any suitable manner such as by a linkage shown at 38.

The manner of operation of the system in FIGS. 1—4 is as follows:

Assuming that vehicle 1 with a cargo is destined to unload at platform 3 as in FIG. 1. The vehicle 1 will approach platform 3 and stop. The driver will operate a control to swing cab 12 90° to the left side of the vehicle. The vehicle is now moved towards platform 3 to within approximately one foot therefrom.

Now the driver will extend magnet 28 by a lever 29 to activate switch 10 and the magnetic attraction causes switch 10 to close and activate motor 7 to open door 5.

The driver now operates a control to activate cylinders 16 and raise the bed 13 a little above platform 3 and then operates another control to activate rams 15 and extend bed 13 approximately two feet over platform 3, as seen in FIG. 3.

The driver next lowers bed 13 onto platform 3 and extends bed 13 all the way to door 5 of the warehouse.

Next, the driver operates a control to activate motor and drum 19 to open bed door 18.

Finally the driver operates a control to activate motors 23 and 24 to roll the load out of bed 13 and onto storage area 4 where the load may be moved to storage lines by whatever conveyor means the warehouse is equipped with. The latter means not being shown as they are varied.

For providing a smoother surface, a pair of flat metal plates 37 can be mounted on top of platform 3.

Since rollers 21 and 22 are arranged to operate separately, cargoes may be arranged thereon whereby only a part may be handled if desired.

After unloading the driver powers bed 13 back off the platform 3 and onto chassis 11. He now operates lever 29 to retract magnet 28 and break the connection. Switch 10 opens and permits the door 5 to close.

The vehicle is backed until there is sufficient clearance to swing cab 12 back to the front of the vehicle again and door 18 is closed and the vehicle is now ready for transit again. Loading will be accomplished in the same manner.

It is apparent that the system of this invention will permit rapid and economical loading and unloading of vehicles by eliminating the use of fork lift trucks and by accomplishing the aforesaid operations by only one operator as well as protecting the cargo from inclement weather at all times without requiring tarpaulins to cover the cargo during handling.

While the system has been described for a covered bed, an open type bed could also be used in the same manner.

While certain specific embodiments of the invention have been illustrated and described in detail herein, many modifications thereof may be made without departing from the spirit and scope of the invention.

I claim:

1. In a mechanized system for the automatic loading and unloading of a cargo between a vehicle and a storage area, said storage area including a warehouse, a closure door therefor and a loading dock in front of said warehouse, said system comprising a vehicle having a chassis, a bed having an open forward end mounted for longitudinal movement along said chassis, an operator's cab carried by the forward end of said chassis and being adapted to swing 90° to one side thereof, means carried by the forward end of said chassis for adjusting the forward end of said bed relative to the height of said dock, means mounted in said chassis for extending said bed onto said dock and up to said door of said warehouse, means mounted in said bed for moving said cargo into and out of said bed, and means carried by said warehouse, said dock and said cab of said vehicle for opening said closure door of said warehouse when said vehicle has approached to a close distance from said dock.

2. A system as set forth in claim 1 wherein said means for adjusting said bed relative to the height of said dock comprises at least one hydraulic cylinder mounted in the forward end of said chassis.

3. A system as set forth in claim 1 wherein said means for extending said bed comprises at least one hydraulic ram pivotally connected at its rearward end to said chassis and at its forward end to said bed.

4. A system as set forth in claim 1 wherein said means for moving said cargo into and out of said bed comprises at least two parallel rows of rollers mounted on the floor of said bed, each row of rollers being separately power operated for rotation in either clockwise or counterclockwise directions whereby partial components of a cargo may be handled.

5. A system as set forth in claim wherein said means to close said warehouse door comprises a motor in said warehouse and in driving connection with said door, a switch located in front of said dock and being in electrical connection with said motor and an extendable magnet operable from said driver's cab and located in front of said cab whereby when said vehicle is in close proximity to said dock, said magnet may be extended to attract and close said switch to activate said motor and open said door.

6. A system as described in claim 1 wherein said dock comprises a raised platform having a height substantially equal to the level of the floor of said bed being covered by at least one flat metal plate.

7. A system as set forth in claim 1 wherein said dock comprises an inclined rack having a length equal to the length of said bed, a series of rollers mounted thereon, a stop mounted on the lower end of said rack to prevent a cargo when loaded on said rollers from prematurely rolling off, and a plunger mounted on said rack and connected to said stop whereby when said plunger is pushed in by said bed, said stop will be dropped to permit said cargo to roll onto said rollers on said bed.

PO-1050
(5/69)

UNITED STATES PATENT OFFICE
CERTIFICATE OF CORRECTION

Patent No. 3,578,185      Dated May 11, 1971

Inventor(s) DAVID F. BLACK

It is certified that error appears in the above-identified patent and that said Letters Patent are hereby corrected as shown below:

Col 4, line 25 (Claim 5, 1st line), after "claim" insert -- 1 --.

Signed and sealed this 3rd day of August 1971.

(SEAL)
Attest:

EDWARD M. FLETCHER, JR.      WILLIAM E. SCHUYLER, JR.
Attesting Officer      Commissioner of Patents